Patented Dec. 1, 1925.

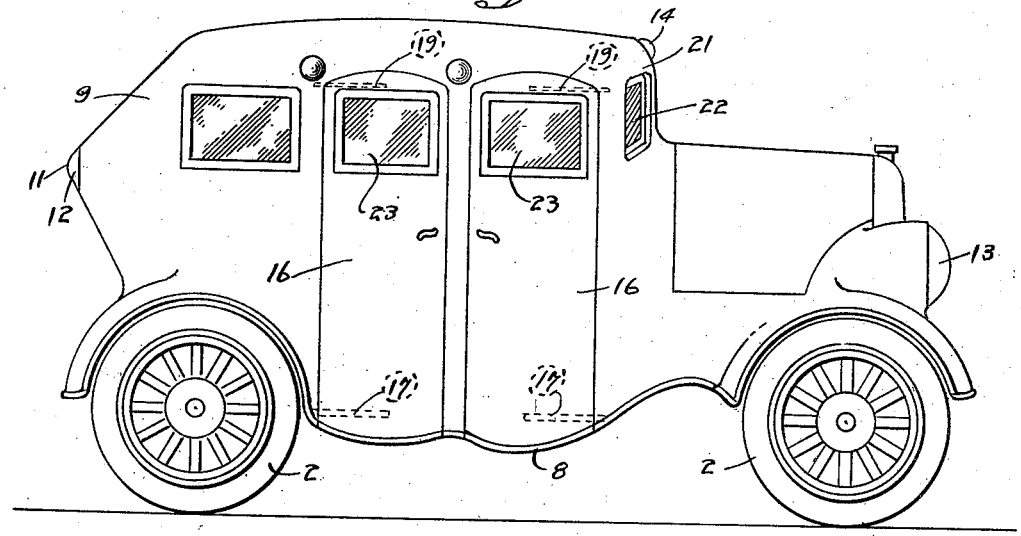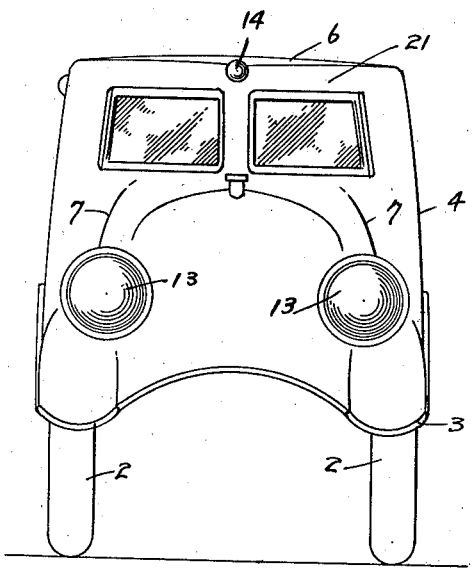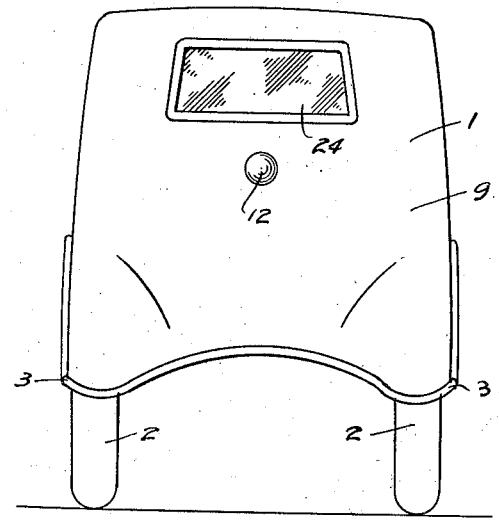

1,563,803

UNITED STATES PATENT OFFICE.

ROBERT LEE SOUTHERN, OF BERKELEY, CALIFORNIA.

VEHICLE BODY.

Application filed February 15, 1923. Serial No. 619,241.

*To all whom it may concern:*

Be it known that I, ROBERT LEE SOUTHERN, a citizen of the United States, and a resident of Berkeley, county of Alameda, State of California, have invented a new and useful Vehicle Body, of which the following is a specification.

The present invention relates to improvements in bodies for motor vehicles and the like and its particular object is to provide a body of particularly graceful lines in which the fenders are made an integral part of the body, the latter rising from the place normally occupied by the outer edges of the fenders in a substantially unbroken line. A further object of the invention is to eliminate the foot boards running along side of the car so that the whole body presents the appearance of a compact unit defined by substantially unbroken horizontal lines as well as vertical lines. By means of this construction a true streamline shape is approached, there being no portions projecting from the sides of the body to cause eddy currents and to thereby impede the progress of the motor vehicle. It is further proposed to shape the body in other respects to more truly present a streamline appearance especially with reference to the rear end of the body. It is further intended to show convenient means facilitating the entry into the car. Further objects and advantages of my body will appear as the specification proceeds.

The preferred form of the invention is illustrated in the accompanying drawing in which Figure 1 shows a side view of my vehicle body, Figure 2 a front view of the same, Figure 3 a rear view and Figure 4 a detail view showing a disappearing step associated with a door of my body. While I have shown only the preferred form of the invention it should be understood that various changes or modifications may be made within the scope of the claim hereto attached without departing from the spirit of the invention.

The principal distinctive feature of my automobile body (1) is that it is built sufficiently wide to cover the wheels (2) in the same manner as is normally done by the fenders. The body rises from its lower margin (3) which is disposed outside of the wheels in a substantially unbroken smooth line (4) to the top (6) which is substantially flat but may be curved slightly. The running board normally connecting the front and rear fenders of the motor vehicles as constructed at the present time is omitted entirely so that no part extends laterally from the body to mar the beauty of the same or to offer resistance to its forward travel. The body is thus made as one compact unit with only slight curvatures in the longitudinal lines, the latter occurring principally about the power plant so as to admit of easy access to the same. The latter curvature is indicated at (7) in the front view. The same principle holds true for the vertical lines of the body, practically all of which are unbroken and curvatures being provided only around the power plant. This construction, besides making for beautiful appearance, offers other advantages. The fenders and the running board used at the present time usually work loose after the car has been operated a certain length of time and cause annoying noises which are eliminated by my structure. In case of collision the smooth construction of my car would in many instances allow two colliding cars to slide along side of each other without doing any harm while two cars provided with running boards and fenders as used at the present time would catch and either tear off the fenders or cause other injury. My construction also makes the car almost hold-up proof since there is nothing on the outside of the car allowing a person to cling on to for the purpose of forcing the driver to stop. Neither would it be easy to stop a car of my construction by another car cutting in on the same since my car could push the latter out of the way.

To render the construction stronger I provide a metal lining or reinforcing strip (8) along the lower margin of the body passing around the whole machine in one continuous line. The latter reinforcing strip would be adapted to receive any severe shocks and to distribute the same over the entire body.

The rear end (9) of my body bulges outwardly and comes to a substantially central point (11) at which latter point the rear light (12) should be mounted. In this manner the rear end is streamlined and prevents eddy currents due to suction. Two headlights (13) may be mounted in the front end in their ordinary position and I preferably use another headlight (14) near the top of the body in a central position. Lateral doors (16) are provided in the usual manner and have steps (17) associated therewith which disappear underneath the body of the car when the doors are closed while they are swung outwardly with the doors into an operative position to facilitate the entry into the car. Corresponding top members (19) may be arranged on the doors to constitute a shield against rain when the doors are opened.

The windshield (21) which preferably also forms an integral part of the body is also streamlined slightly and provided with lateral windows (22). Suitable windows (23) are provided in the doors and another window (24) in the rear end of the body.

It will readily appear that a compact body of the character described would be considerably stronger than any car having many loose and assembled parts. It should also be cheaper in construction since less labor is required for the assembling. The power plant would be more readily accessible since it is not necessary to bend over the fender or running board to reach the spark plugs or other parts that may need attention. A body of my design would have larger seating capacity than the bodies now commonly used and yet be graceful in outline.

I claim:

An enclosed body and engine hood for passenger motor vehicles, comprising a shell adapted to extend laterally and longitudinally over the upper segments of the ground wheels of the vehicle and extending vertically along the sides of the body in unbroken lines and flush with the portions overhanging the wheels, the said sides of the body converging slightly at their upper ends and joined by an arched roof and further joined at their rear ends by an arched end wall, the said sides being further provided intermediately with door openings extending through the lower edges thereof together with doors disposed in the said openings, and a reinforcing lip around the entire lower edge of the shell.

ROBERT LEE SOUTHERN.